United States Patent
Elmaleh

(10) Patent No.: US 9,138,681 B2
(45) Date of Patent: Sep. 22, 2015

(54) REDUCING GLOBAL WARMING

(76) Inventor: David R. Elmaleh, Newton, MA (US)

(*) Notice: Subject to any disclaimer, the term of this patent is extended or adjusted under 35 U.S.C. 154(b) by 1195 days.

(21) Appl. No.: 12/193,512

(22) Filed: Aug. 18, 2008

(65) Prior Publication Data

US 2010/0040504 A1     Feb. 18, 2010

(51) Int. Cl.
*B01D 53/62* (2006.01)

(52) U.S. Cl.
CPC .......... *B01D 53/62* (2013.01); *B01D 2251/304* (2013.01); *B01D 2251/402* (2013.01); *B01D 2251/404* (2013.01); *B01D 2251/604* (2013.01); *B01D 2257/504* (2013.01); *B01D 2259/124* (2013.01); *Y02C 10/04* (2013.01)

(58) Field of Classification Search
CPC ...................................................... B01D 53/62
USPC ..................................... 422/4, 120, 122, 124
See application file for complete search history.

(56) References Cited

U.S. PATENT DOCUMENTS

| | | | |
|---|---|---|---|
| 5,405,590 | A | 4/1995 | Macedo et al. ............... 423/210 |
| 6,200,543 | B1 | 3/2001 | Allebach et al. |
| 6,352,645 | B1 * | 3/2002 | Wilfong ........................ 210/767 |
| 6,843,835 | B2 * | 1/2005 | Fornai et al. ..................... 96/53 |
| 6,890,497 | B2 | 5/2005 | Rau et al. |
| 7,067,456 | B2 | 6/2006 | Fan et al. |
| 2006/0093540 | A1 | 5/2006 | Fan et al. |
| 2006/0185985 | A1 | 8/2006 | Jones ............................ 205/508 |
| 2007/0217981 | A1 | 9/2007 | Van Essendelft |
| 2008/0031801 | A1 | 2/2008 | Lackner et al. ............... 423/438 |

OTHER PUBLICATIONS

PCT International Search Report based on PCT/US2008/073488 dated Nov. 14, 2008.
Patent Cooperation Treaty, "International Search Report", dated Oct. 13, 2009, pp. 1-2.

* cited by examiner

*Primary Examiner* — Sean E Conley
(74) *Attorney, Agent, or Firm* — Peter B. Scull; Hamilton, DeSanctis & Cha LLP

(57) ABSTRACT

A system and method for reducing global warming. The system can include a container having a body portion for retaining a quantity of alkaline metal hydroxide and collecting a precipitate. At least one inlet on the container can be utilized for introducing a volume of air containing $CO_2$ into the alkaline metal hydroxide, so that the $CO_2$ in the volume of air can react with the alkaline metal hydroxide to reduce the amount of $CO_2$ in the volume of air and to form a precipitate in the body portion of the container. At least one outlet on the container can be included for releasing the volume of air having reduced $CO_2$ content into the atmosphere. A pump can be included for injecting the volume of air containing $CO_2$ into the alkaline metal hydroxide under pressure.

20 Claims, 7 Drawing Sheets

REDUCING GLOBAL WARMING

TECHNICAL FIELD

This invention relates generally to systems and methods for reducing global warming, and more particularly to the reduction of carbon dioxide ($CO_2$) gas in the atmosphere.

BACKGROUND ART

The effects of global warming on the environment and for human life are numerous and varied. Some effects of recent climate change may already be occurring. Rising sea levels, glacier retreat, Arctic shrinkage, and altered patterns of agriculture are cited as direct consequences, but predictions for secondary and regional effects include extreme weather events, an expansion of tropical diseases, changes in the timing of seasonal patterns in ecosystems, and drastic economic impact. Concerns have led to political activism advocating proposals to mitigate, eliminate, or adapt to it.

Projected climate changes due to global warming have the potential to lead to future large-scale and possibly irreversible effects at continental and global scales. The likelihood, magnitude, and timing is uncertain and controversial, but some examples of projected climate changes include significant slowing of the ocean circulation that transports warm water to the North Atlantic, large reductions in the Greenland and West Antarctic Ice Sheets, accelerated global warming due to carbon cycle feedbacks in the terrestrial biosphere, and releases of terrestrial carbon from permafrost regions and methane from hydrates in coastal sediments.

Greenhouse gases are produced by many natural and industrial processes. Greenhouse gases in the earth's atmosphere help regulate global temperatures through the greenhouse effect. Greenhouse gases are essential to maintaining the temperature of the earth; without them the planet would be so cold as to be uninhabitable.

However, excess greenhouse gases contribute to global warming by raising the temperature of a planet to dangerous levels. Since the beginning of the Industrial Revolution, the concentrations of many of the greenhouse gases have increased. The concentration of $CO_2$ has increased by about 100 parts-per-million (ppm) (i.e., from 280 ppm to 380 ppm). The first 50 ppm increase took place in about 200 years, from the start of the Industrial Revolution to around 1973; the next 50 ppm increase took place in about 33 years, from 1973 to 2006.

Accordingly, there is a need for a system and methods that reduce global warming by decreasing the $CO_2$ content in the atmosphere.

SUMMARY OF THE INVENTION

In one aspect, the invention features a system for reducing global warming by reducing carbon dioxide emissions in cities and in industrial processes. The system can include a container having a body portion for retaining a quantity of alkaline metal hydroxide or other base, and collecting a precipitate. The container can include at least one inlet for introducing a volume of fluid, such as air containing $CO_2$, into the alkaline metal hydroxide, so that the $CO_2$ in the volume of air can react with the alkaline metal hydroxide to reduce the amount of $CO_2$ in the volume of air and to form a precipitate in the body portion of the container. The container can also include at least one outlet for releasing the volume of air having reduced $CO_2$ content into the atmosphere. Multiple systems can be implemented in areas having a high $CO_2$ concentration.

One or more of the following features may also be included. A filter having adsorbing material for filtering the volume of air containing $CO_2$ prior to introducing the volume of air containing $CO_2$ into the alkaline metal hydroxide to remove contaminant particles. A pump for injecting the volume of air containing $CO_2$ into the alkaline metal hydroxide under pressure. A dispersal mechanism for efficiently dispersing the volume of air containing $CO_2$ throughout the alkaline metal hydroxide. At least one circulator or stirrer for maintaining the circulation and mixture uniformity of the alkaline metal hydroxide. A monitor for monitoring pH levels of the alkaline metal hydroxide, and providing notifications and alerts when the pH levels are not within predetermined threshold levels. A vacuum for extracting the precipitate from the container. The container can include a hatch or valve for removing the precipitate from the container. The alkaline metal hydroxide can be calcium hydroxide, sodium hydroxide, or magnesium hydroxide. The volume of air containing $CO_2$ can be obtained from the atmosphere. The volume of air containing $CO_2$ can be obtained from an industrial process that produces $CO_2$. The precipitate can be calcium carbonate, sodium carbonate, or magnesium carbonate.

In another aspect, the invention features a method of reducing global warming. The method includes 1) providing a container having a quantity of an alkaline metal hydroxide, 2) introducing a volume of air containing $CO_2$ into the alkaline metal hydroxide to allow the $CO_2$ in the volume of air to react with the alkaline metal hydroxide to reduce the amount of $CO_2$ in the volume of air and to form a precipitate, 3) collecting the precipitate in the container, and 4) releasing air having reduced $CO_2$ content from the container into the atmosphere.

One or more of the following features may also be included. Filtering the volume of air containing $CO_2$ through a filter having adsorbing material prior to introducing the volume of air containing $CO_2$ into the alkaline metal hydroxide to remove contaminant particles. Monitoring the pH level of the alkaline metal hydroxide. Controlling precipitate production by adjusting the pH level of the alkaline metal hydroxide. Replenishing the quantity of alkaline metal hydroxide when the pH level of the alkaline metal hydroxide drops below a predetermined level. Extracting the precipitate from the container. Purifying the precipitate by treating the precipitate with additional amounts of $CO_2$. Injecting the volume of air into the alkaline metal hydroxide under pressure. Finely dispersing the volume of air throughout the alkaline metal hydroxide under pressure.

DESCRIPTION OF SPECIFIC EMBODIMENTS

Figure 1:
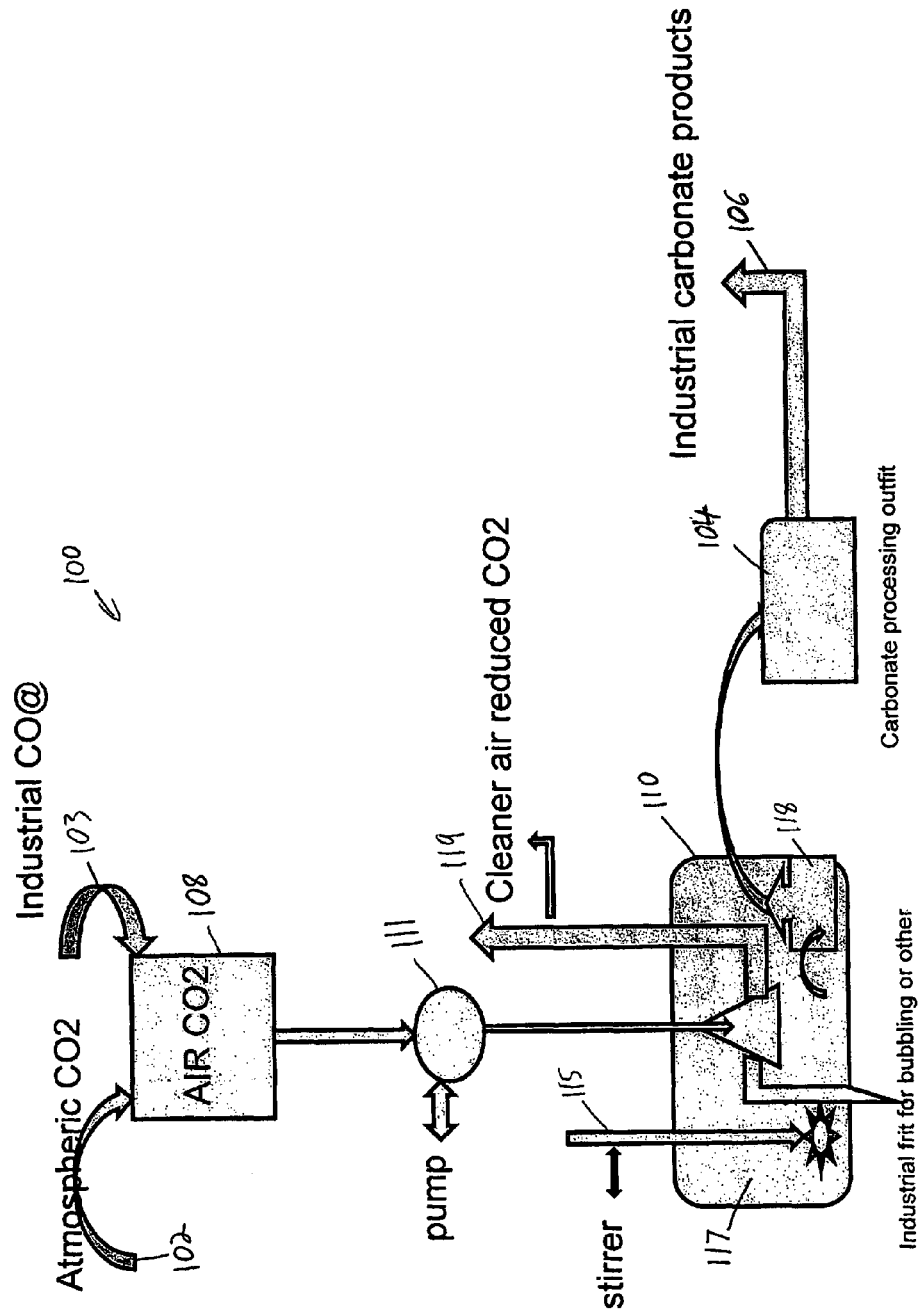
FIG. 1 illustrates a flow diagram pertaining to one embodiment of the present invention.

Generally, the present invention can reduce $CO_2$ content in the atmosphere or from an industrial process that produces $CO_2$. Reduction of $CO_2$ levels in the atmosphere can result in lower temperatures, and therefore a reduction in overall global warming. Referring to FIG. 1, flow diagram 100 illustrates a process for reducing $CO_2$ in accordance with one embodiment of the present invention. Large volumes of fluid, such as air containing $CO_2$ 108 from the atmosphere 102 or $CO_2$ emissions from an industrial process 103, can be introduced into one or more containers 110 having a quantity of metal hydroxide or other base. In an example, the metal hydroxide or other base may be an alkaline metal hydroxide 117 (e.g., calcium hydroxide, sodium hydroxide, magnesium hydroxide, ammonium hydroxide). Other comparable hydroxides may also be used.

Upon contact, a chemical reaction occurs in which the $CO_2$ reacts with the alkaline metal hydroxide 117, a precipitate 118 can be generated as a reaction product and deposited in the container 110 in the form of a carbonate (e.g., calcium carbonate, sodium carbonate, magnesium carbonate), and volumes of air having a reduced amount of $CO_2$ 119 can be released back into the atmosphere. The resulting precipitate 118 can be collected, processed further and purified at an offline facility 104, and sold as an industrial-grade carbonate 106 to offset operating costs.

Figure 2:
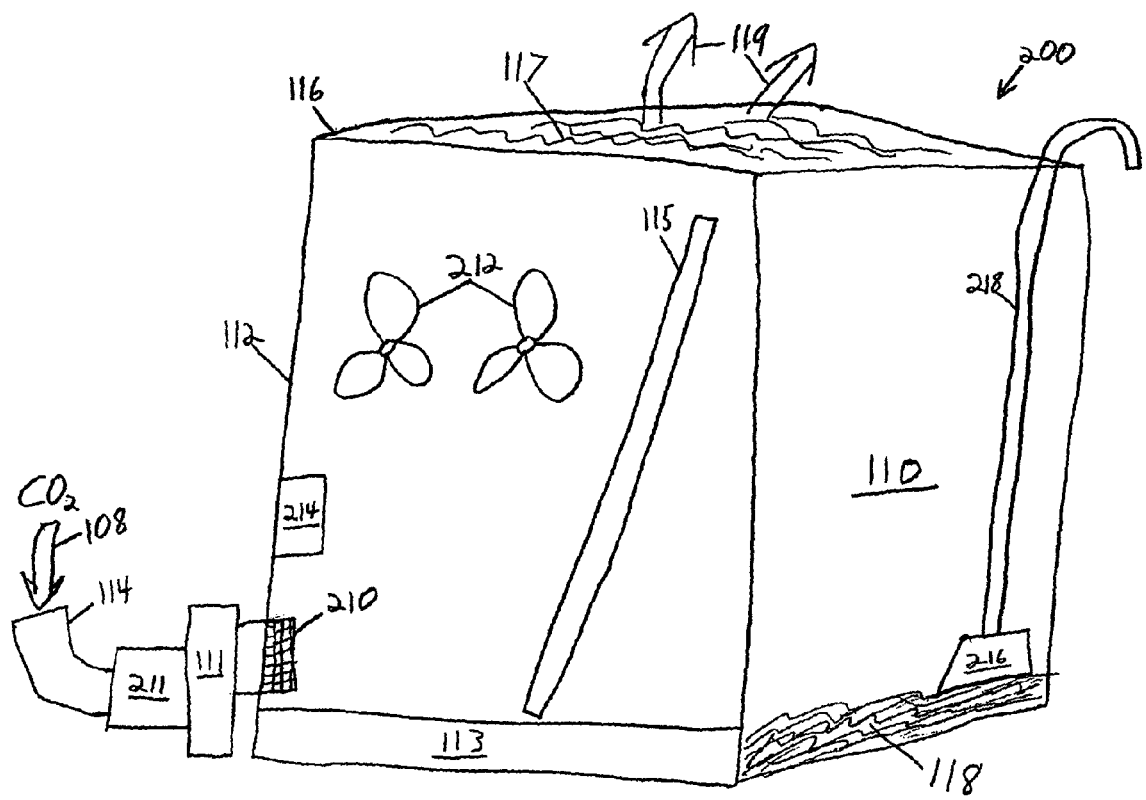
FIG. 2 illustrates a system for use in connection with an embodiment of the present invention.

Referring to FIG. 2, there is illustrated a system 200 for reducing $CO_2$ in accordance with an embodiment of the present invention. The system 200 includes a container 110 having a body portion 112 for retaining a quantity of alkaline metal hydroxide 117 and collecting the precipitate 118. The container 110, in an embodiment, can be designed to process large quantities of $CO_2$, and to contain large quantities of alkaline metal hydroxide 117. For example, using calcium hydroxide (chemical symbol: $Ca(OH)_2$) as the alkaline metal hydroxide 117, 74 grams of calcium hydroxide can react with 44 grams of $CO_2$, and about 100 grams of calcium carbonate (chemical symbol: $CaCO_3$) can be generated as a precipitate 118 (i.e. reaction product). Likewise, 740 tons of $Ca(OH)_2$ can react with 440 tons of $CO_2$. Therefore, to process 7.5 billion tons of $CO_2$ emissions, 12.5 billion tons of $Ca(OH)_2$ would be required. The size of the container (or containers) 110 can be selected based on the processing requirements of a particular batch process or other implementation parameters.

Inner surfaces of the container 110 (and all other components coming in contact with hydroxide 117), in an embodiment, can be made of alkali-resistant-material (e.g., ceramic, aluminum oxide, silicon carbide) to resist the corrosive effects of the alkali metal hydroxide 117. In various embodiments, the container 110 can include one or more manual, or preferably automated circulators 212 or stirrers 115 for maintaining the circulation and mixture uniformity of the alkaline metal hydroxide 117.

The container 110 can also include at least one inlet 114 through which a volume of air containing $CO_2$ 108 can be introduced into a quantity of alkaline metal hydroxide 117 within the container 110. In some embodiments, the inlet 114 can be coupled to piping that extends directly to a source of $CO_2$ emissions 103, such as, an industrial process at a nearby factory. The inlet 114 can also be coupled to a pump 111, which can inject the volume of air containing $CO_2$ 108 into the alkaline metal hydroxide 117, for example, under pressure to disperse the $CO_2$ throughout the alkaline metal hydroxide 117.

In an embodiment, a filter 211 can be coupled to the inlet 114 and the pump 111. The filter 211 can include adsorbing material for filtering the volume of air containing $CO_2$ 118 to remove contaminant particles. The filter 211 can also include a matrix of tortuous pathways through which the volume of air can travel in order to further filter, and remove contaminant particles from the volume of air prior to introduction into container 110. Once filtered, the volume of air containing $CO_2$ 108 can then be injected into the alkaline metal hydroxide 117 by the pump 111 to reduce $CO_2$ from the volume of air.

The container 110 can include at least one outlet 116 for releasing the volume of air having reduced $CO_2$ content 119 into the atmosphere. The outlet 116 can vary in shape and size based on the selected implementation of the container 110. For example, as shown in FIG. 2, the container 110 can be a large open-top tank similar to a pool. Accordingly, the outlet 116 may be an entire open-top surface of the container 110. As a further example and with reference to FIG. 3, the outlet 116 can be a narrow opening in the container 110. A smaller outlet 116 may prevent foreign particles and debris from contaminating the alkaline metal hydroxide 117 in the container 110.

The container 110 can also include a valve or leak-proof hatch 113 through which the precipitate 118 can be removed from the container 110. Alternatively, a manual or automated submersible vacuum 216 (FIG. 2) can be utilized to traverse the bottom of the container 110, and remove solid particles of the precipitate 118. The vacuum 216 can include a flexible hose 218 through which the precipitate 118 can be transferred out of the container 110. The vacuum 216 and accompanying hose 218 can be made of alkaline-resistant material to mitigate the corrosive effects of the alkaline metal hydroxide 117.

The container 110 can further include a monitoring system 214 that can automatically monitor pH levels of the alkaline metal hydroxide 117. The monitoring system 214 can provide notifications and alerts when pH levels exceed predetermined threshold levels. Production of precipitate 118 can be controlled through adjustment of the pH level of the alkaline metal hydroxide 117. For example, the monitoring system 214 can provide notification of when the pH level of the alkaline metal hydroxide 117 drops below a predetermined level, so that the quantity of alkaline metal hydroxide 117 can be replenished. Alternatively, the pH levels of the alkaline metal hydroxide 117 can be manually sampled and tested.

Figure 3:
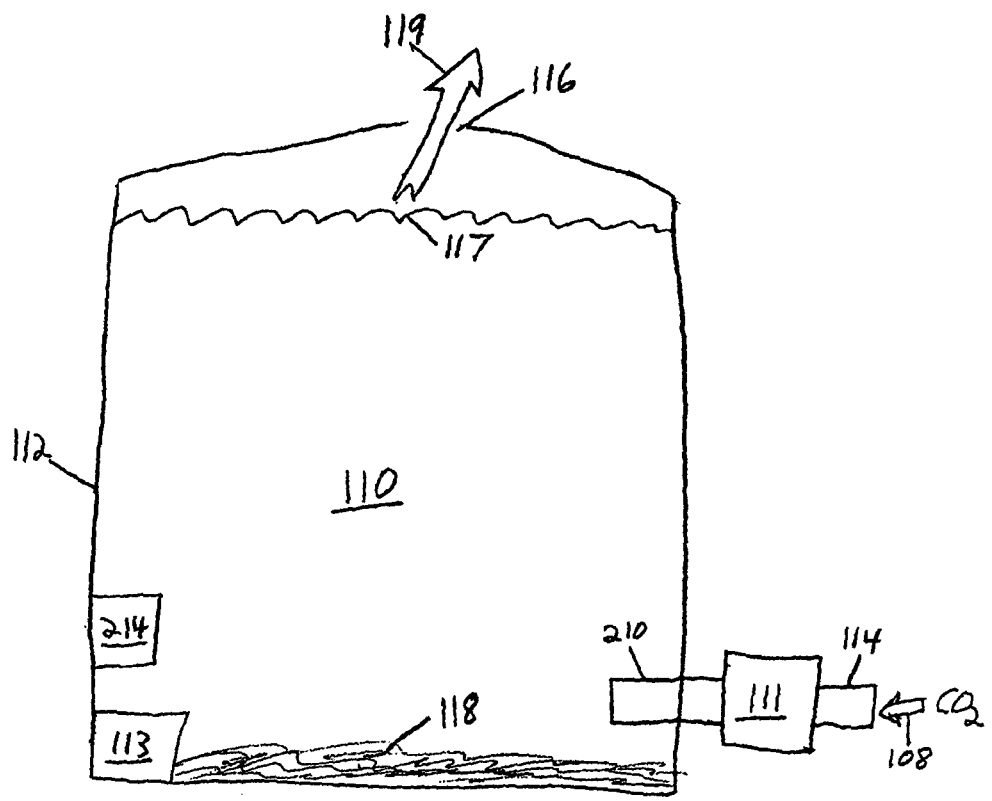
FIG. 3 illustrates a system for use in connection with one embodiment of the present invention.
Figure 4:
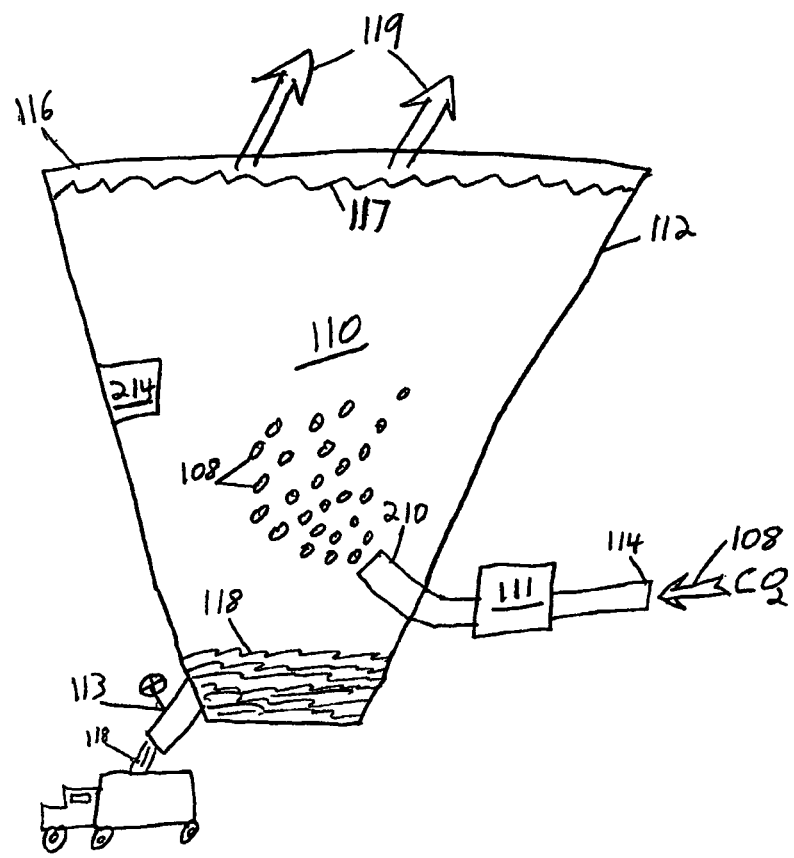
FIG. 4 illustrates a system configured in accordance with one embodiment of the present invention.

Referring to FIG. 3 and FIG. 4, in an embodiment, the container 110 can include a dispersal mechanism 210 for efficiently dispersing the $CO_2$ 108 throughout a volume of alkaline metal hydroxide 117. The dispersal mechanism, in one embodiment, 210 can be coupled to the pump 111 and inlet 114, and can extend into the container 110. In other embodiments, the dispersal mechanism 210 may not extend into the container 110, but instead may be built into an inner surface of the container 110 (as shown in FIG. 2).

Figure 5:
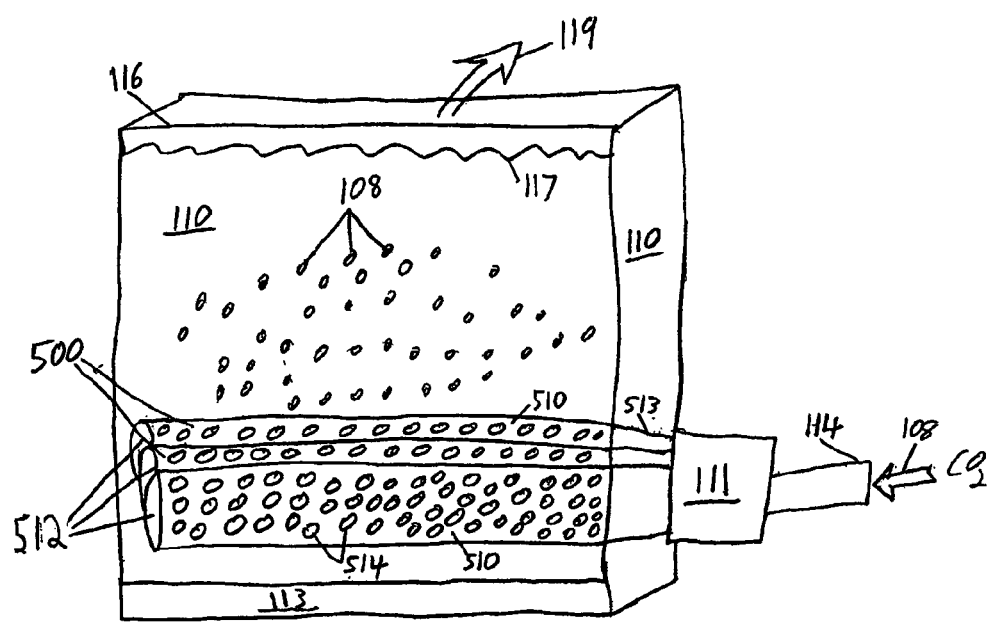
FIG. 5 illustrates a subsystem for use in connection with one embodiment of the present invention.

Referring to FIG. 5, in another embodiment, the container 110 can be configured with a dispersal mechanism 500 that includes one or more tubes 510. Each tube 510 can include a plugged end 512 through which nothing can flow. The opposite end 513 of the tube 510 can be coupled to the pump 111. Each tube 510 can have multiple perforations 514 distributed over the entire surface area of the tube 510 that is located in the container 110, and in contact with the alkaline metal hydroxide 117.

The perforations 514 can include a covering (not shown) that can be electronically, or mechanically actuated to open and closed positions. In the non-actuated state, or closed position, nothing can flow from within the tubes 510 and into the alkaline metal hydroxide 117. Likewise, the alkaline metal hydroxide 117 can be prevented from flowing through the perforations 514 and into the tubes 510. However, when the pump 111 injects the volume of air containing $CO_2$ 108 into the dispersal mechanism 500, the perforations 514 can be actuated to their open position. This allows the volume of air containing $CO_2$ 108 to exit through all of the perforations, and finely disperse throughout the alkaline metal hydroxide 117 in container 110. Finely dispersing the volume of air containing $CO_2$ 108 facilitates the subsequent chemical reaction. It should be noted that during actuation, as the volume of air exits through the perforations 514, the outflow of the volume of air can minimize or prevent the alkaline metal hydroxide from entering through the perforations 514.

Figure 6:
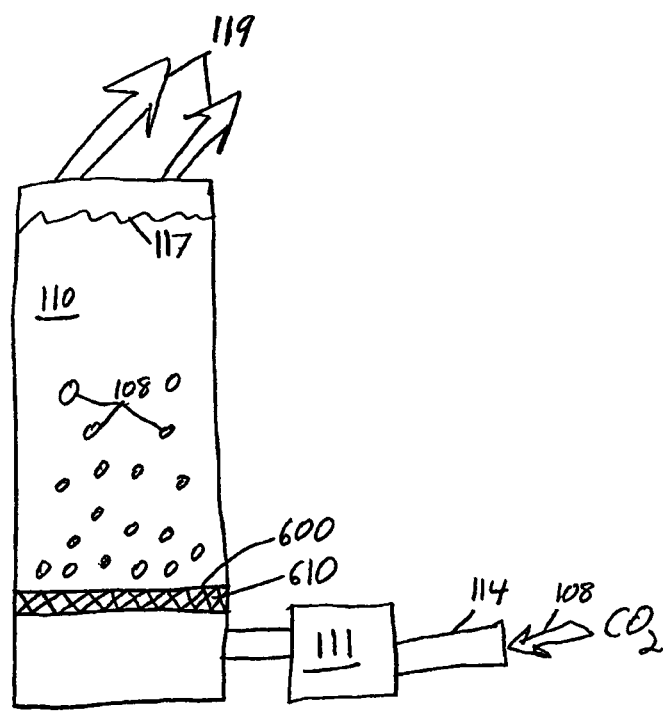
FIG. 6 illustrates a subsystem configured in accordance with one embodiment of the present invention.

Referring to FIG. 6, in another embodiment, the container 110 can be configured with a dispersal mechanism 600 that resembles a grid or support plate that includes multiple perforations 610. The perforations 610 can be electronically or mechanically actuated, as described above, to prevent or allow the volume of air containing $CO_2$ 108 to exit through all of the perforations 610, and finely disperse throughout the alkaline metal hydroxide 117 in container 110.

Figure 7:
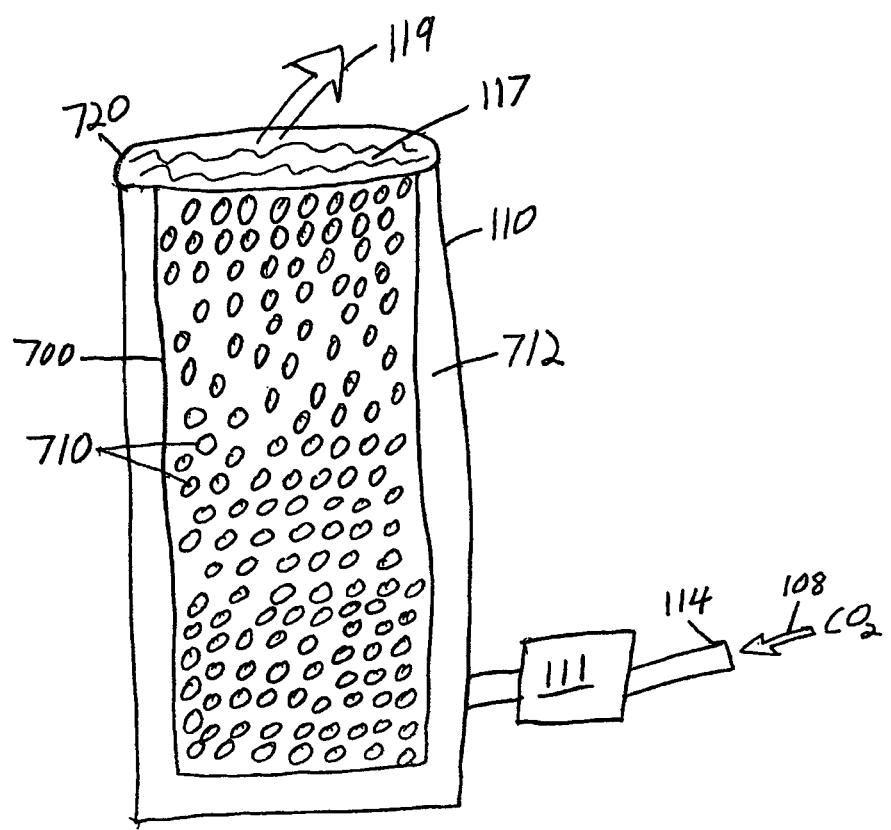
FIG. 7 illustrates a subsystem for use in connection with one embodiment of the present invention.

Referring to FIG. 7, in another embodiment, the container 110 can be configured with a dispersal mechanism 700 that can be included as an integral part of the inner surface of the container 110. The dispersal mechanism 700 can have a smaller diameter than that of the container 110 to allow for a gap 712 between the dispersal mechanism 700 and the container 110. The container 110 and the dispersal mechanism 700 can be welded, or otherwise connected together along the rim of the container 110 to create an airtight seal 720. The dispersal mechanism 700 can include multiple perforations that can be electronically or mechanically actuated, as described above, to prevent or allow the volume of air containing $CO_2$ 108 injected from pump 111 to exit through all of the perforations 710, and finely disperse throughout the alkaline metal hydroxide 117 in container 110.

In operation, the container 110 can be filled with a quantity of an alkaline metal hydroxide 117, for instance, calcium hydroxide (chemical symbol: $Ca(OH)_2$). Depending on the particular application, circulator 212 or stirrer 115 can be utilized to mix and maintain the uniformity of the calcium hydroxide mixture.

A volume of air containing $CO_2$ 108 can initially be filtered through filter 211 to remove contaminant particles, and can then be injected under pressure from pump 111 through the dispersing mechanism and into the calcium hydroxide. Upon contact, the following chemical reaction occurs:

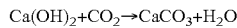

$$Ca(OH)_2 + CO_2 \rightarrow CaCO_3 + H_2O$$

The calcium hydroxide reacts with the $CO_2$ in the volume of air to produce calcium carbonate (chemical symbol: $CaCO_3$) as a precipitate and water (chemical symbol: $H_2O$). The calcium carbonate and water can be collected in the container 110. The reaction effectively reduces the amount of $CO_2$ in the volume of air, and the volume of air with reduced $CO_2$ content can then be released from the container 110 through outlet 116 and into the atmosphere.

Since water and $CaCO_3$ are produced in the reaction, over time the calcium hydroxide in container 110 can become diluted and may not be as effective at processing $CO_2$. Therefore, the pH level of the calcium hydroxide can be monitored continuously, or periodically to determine when the pH level drops below a predetermined level, at which point the quantity of calcium hydroxide in container 110 can be replenished. The pH level of the calcium hydroxide can also be adjusted to control precipitate production.

Calcium carbonate is a white, crystalline mineral which is widely distributed in nature and often found in rocks. It does not dissolve in water. It is the major ingredient in such minerals as chalk, calcite, marble, limestone, coral and Iceland spar. Calcium carbonate is also an ingredient of tooth powders and tooth pastes. It is used extensively in the construction industry, and in the manufacture of cement and concrete. It is used as a medicine to neutralize acidity in the stomach. It is also used in white paint, cleaning powder, calcimine, and paper filler. It is a source of calcium and carbon dioxide in industry.

The calcium carbonate precipitate can be removed from the container 110 through hatch 113, or by utilizing submersible vacuum 216 to scour the bottom of container 110 and extract the solid precipitate particles. Once removed from the container 110, the calcium carbonate can be processed further. For example, it can be filtered and purified from excess base by treating the calcium carbonate with additional amounts of $CO_2$, or other substances depending on the industrial gases produced. The purified calcium carbonate produced by this process can be sold to offset the costs of operating and maintaining this system.

In the embodiment discussed above, calcium hydroxide is utilized as the alkaline metal hydroxide simply for illustrative purposes. However, any type of alkaline metal hydroxide can be used to process $CO_2$ as discussed above. For example, sodium hydroxide or magnesium hydroxide can be substituted for the calcium hydroxide. The resulting precipitate would then be sodium carbonate and magnesium carbonate respectively.

In another embodiment, the alkaline metal hydroxide 117 can be a mixture of several metal hydroxides, or alkali base in proportions that may produce a required mixture for use in a particular industry process.

In other embodiments, the interaction between the $CO_2$ and metal hydroxide can be increased by catalysis, by increasing surface reaction, or by adding solids to the metal hydroxide that will increase precipitation of carbonates. For example, since $CO_2$ is more soluble in cold solutions, the temperature of the hydroxide solution in the container can be lowered by utilizing a cooling system (not shown). The cooling system can also be utilized to lower the temperature of the exothermic reaction that occurs as a result of the $CO_2$ reacting with the metal hydroxide. Alternatively, the metal hydroxide in the container can be replenished at frequent intervals to cool the reaction. In another embodiment, metal hydroxide can be continuously replenished, and cycled through the container to cool the reaction.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

I claim:
1. A system for reducing $CO_2$ in air comprising:
   a reaction container configured for a gas-liquid reaction to occur therein;
   a body of liquid solution comprising a quantity of calcium hydroxide in solution therein disposed in the reaction container, the reaction container being open to atmospheric pressure having a body portion for retaining the body of liquid solution comprising a quantity of calcium hydroxide in solution therein;

at least one inlet disposed in the reaction container for communication of gaseous air into and within the body of liquid solution within the reaction container;

the at least one inlet including a dispersal mechanism for introducing a finely dispersed volume of gaseous air containing $CO_2$ into and through the body of liquid solution comprising calcium hydroxide in solution therein to allow the $CO_2$ in the volume of air to react with the calcium hydroxide in solution in the body of liquid solution to produce a volume of gaseous air having a reduced $CO_2$ content therein and to form a precipitate of calcium carbonate in the body portion of the reaction container;

the dispersal mechanism configured to finely disperse the finely dispersed volume of gaseous air containing $CO_2$ throughout the body of liquid solution comprising calcium hydroxide in solution therein within the reaction container; and at least one outlet from the reaction container for releasing the volume of gaseous air having reduced $CO_2$ content into the atmosphere, wherein the body portion of the reaction container comprises a precipitate collection region adapted to collect the precipitate of calcium carbonate for removal from the container;

wherein the reaction container includes a valve or hatch or submersible vacuum for removing the precipitate of calcium carbonate from the container.

2. The system of claim 1, further comprising a filter having one or more of adsorbing material and a matrix of tortuous pathways for filtering the volume of air containing $CO_2$ prior to introducing the volume of air containing $CO_2$ into the calcium hydroxide to remove contaminant particles.

3. The system of claim 1, further comprising a pump for injecting the volume of air containing $CO_2$ into the calcium hydroxide under pressure.

4. The system of claim 1, further comprising a dispersal mechanism including one or more tubes disposed in the liquid solution, the one or more tubes having one end in communication with a source of air, and the other end plugged and therebetween multiple perforations within the body of liquid solution for introduction of the air from the one or more tubes into the body of liquid solution for efficiently dispersing the volume of air containing $CO_2$ throughout the calcium hydroxide.

5. The system of claim 1, further comprising at least one circulator or stirrer for maintaining the circulation and mixture uniformity of the calcium hydroxide.

6. The system of claim 1, further comprising a monitor for monitoring pH levels of the calcium hydroxide and providing notifications and alerts when the pH levels are not within predetermined threshold levels.

7. The system of claim 1, further comprising a vacuum for extracting the precipitate of calcium carbonate from the container.

8. The system of claim 1, wherein the body portion of the container collects a precipitate of calcium carbonate.

9. The system of claim 1, wherein the volume of air containing $CO_2$ is obtained from the atmosphere.

10. The system of claim 1, wherein the volume of air containing $CO_2$ is obtained from an industrial process that produces $CO_2$.

11. The system of claim 1, wherein the precipitate is sodium carbonate.

12. The system of claim 1, wherein the precipitate is magnesium carbonate.

13. The system of claim 1, wherein the precipitate collection region comprises a bottom of the container.

14. The system of claim 1, further comprising a precipitate collection system for collecting the precipitate of calcium carbonate from the precipitate collection region of the container.

15. The system of claim 14, wherein the precipitate collection system comprises a valve coupled to the container adapted to allow removal the precipitate from the container.

16. The system of claim 14, wherein the precipitate collection system comprises a hatch of the container adapted to remove the precipitate from the collector.

17. The system of claim 14, wherein the precipitate collection system comprises a submersible vacuum adapted to remove the precipitate from the precipitate collection region.

18. The system of claim 1, further comprising a cooling system configured to lower a temperature of the liquid solution.

19. The system of claim 1, further comprising a dispersal apparatus having perforations configured to be electronically, or mechanically actuated to open and closed positions to control dispersal of the volume of air into and through the body of liquid solution.

20. The system of claim 1, wherein the dispersal mechanism includes one or more perforations for finely dispersing the volume of air containing $CO_2$ throughout the calcium hydroxide in the container.

* * * * *